(12) United States Patent
Bailey

(10) Patent No.: US 10,222,038 B2
(45) Date of Patent: Mar. 5, 2019

(54) LUMINAIRE CONFORMING ACCESSORY INTERFACE

(71) Applicant: Hubbell Incorporated, Shelton, CT (US)

(72) Inventor: Christopher Bailey, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/944,174

(22) Filed: Apr. 3, 2018

(65) Prior Publication Data

US 2018/0283667 A1    Oct. 4, 2018

Related U.S. Application Data

(60) Provisional application No. 62/481,375, filed on Apr. 4, 2017.

(51) Int. Cl.
*F21V 23/06* (2006.01)
*F21V 23/00* (2015.01)
*F21V 23/04* (2006.01)
*F21V 21/30* (2006.01)

(52) U.S. Cl.
CPC ............ *F21V 23/008* (2013.01); *F21V 21/30* (2013.01); *F21V 23/0471* (2013.01); *F21V 23/06* (2013.01)

(58) Field of Classification Search
CPC .. B60Q 1/2611; F21S 4/22; F21V 5/00; F21V 5/04; F21V 21/00; F21V 23/00; F21V 23/008; F21V 23/0435; F21V 23/0442; F21V 23/0471; F21V 23/06; F21V 23/045; F21Y 2115/10; H05B 33/0884; H05B 37/02; H05B 37/0227
See application file for complete search history.

(56) References Cited

U.S. PATENT DOCUMENTS

| | | | | |
|---|---|---|---|---|
| 5,588,735 A | * | 12/1996 | Harada | A45B 3/00 135/910 |
| 2012/0139426 A1 | * | 6/2012 | Ilyes | F21V 23/02 315/152 |
| 2013/0107536 A1 | * | 5/2013 | Hiraoka | F21S 8/04 362/277 |
| 2015/0216017 A1 | * | 7/2015 | Pratt | H05B 37/0227 315/291 |
| 2017/0156423 A1 | * | 6/2017 | Tiffin | A41D 19/0157 |
| 2017/0231053 A1 | * | 8/2017 | Underwood | G06T 7/20 |
| 2017/0368984 A1 | * | 12/2017 | Salter | B60Q 1/0035 |
| 2018/0092186 A1 | * | 3/2018 | Stuby, Jr. | H05B 37/0227 |

\* cited by examiner

*Primary Examiner* — Hargobind S Sawhney
(74) *Attorney, Agent, or Firm* — Michael Best & Friedrich, LLP

(57) ABSTRACT

A luminaire includes a housing containing a light emitter. A lens is connected to the housing. An accessory interface is connected to one of the lens or the housing. A control component is connected to the accessory interface. The accessory interface includes a shape conforming material configured to receive the control component and to eliminate discontinuities between the control component and the lens or housing.

20 Claims, 5 Drawing Sheets

LUMINAIRE CONFORMING ACCESSORY INTERFACE

RELATED APPLICATION(S)

This application is based on U.S. Provisional Application Ser. No. 62/481,375, filed Apr. 4, 2017, the disclosure of which is incorporated herein by reference in its entirety and to which priority is claimed.

FIELD

Various exemplary embodiments relate to luminaires and interfaces used to connect accessory modules with a luminaire housing.

BACKGROUND

Luminaire based control components are increasingly used to provide networking and automatic control of indoor and outdoor luminaires. These control components can include drivers, sensors, and communications equipment integrated into or connected to a luminaire housing. Luminaire-based controls are capable are generating a greater level of energy savings by establishing a more granular level of demand-side control than typical room or area sensors.

The practice of integrating luminaire based controls often results in a disjointed appearance. Luminaire housing sizes, shapes, and configurations can be driven by industry standards or standard sizes associated with legacy luminaires that were developed prior to the use of housing based controls. The same luminaire may also be used in different environments, resulting in different control components being used with the same housings in different applications. Integrating or connecting different control components into luminaire housings can therefore result in the presence of gaps between mounting surfaces. Further, most luminaire surfaces are subject to manufacturing tolerances which can increase the disjointed appearance.

SUMMARY

According to an exemplary embodiment, a luminaire includes a housing containing a light emitter. A lens is connected to the housing. An accessory interface is connected to one of the lens or the housing. A control component is connected to the accessory interface. The accessory interface includes a shape conforming material configured to receive the control component and to eliminate discontinuities between the control component and the lens or housing.

According to an exemplary embodiment, a luminaire includes a housing containing a light emitter. A lens is connected to the housing and includes an opening. A control component extends through the lens opening. An accessory interface covers the lens opening. The accessory interface includes a shape conforming material.

According to an exemplary embodiment, a luminaire includes a housing containing a light emitter. A lens is connected to the housing. A sensor has a first portion positioned inside of the lens and a second portion extending from the exterior of the lens. An accessory interface is positioned between the first portion of the sensor and the second portion of the sensor. The accessory interface includes a shape conforming material.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Various exemplary embodiments are directed to a luminaire housing that includes an accessory interface. The accessory interface includes a shape-conforming material that can resilient deform capable of filling in voids between a control component and a portion of a luminaire, resulting in a more uniform surface appearance. The accessory interface can also be used to connect a control component to a non-horizontal surface while maintaining the control component in a horizontal orientation.

Figure 1:
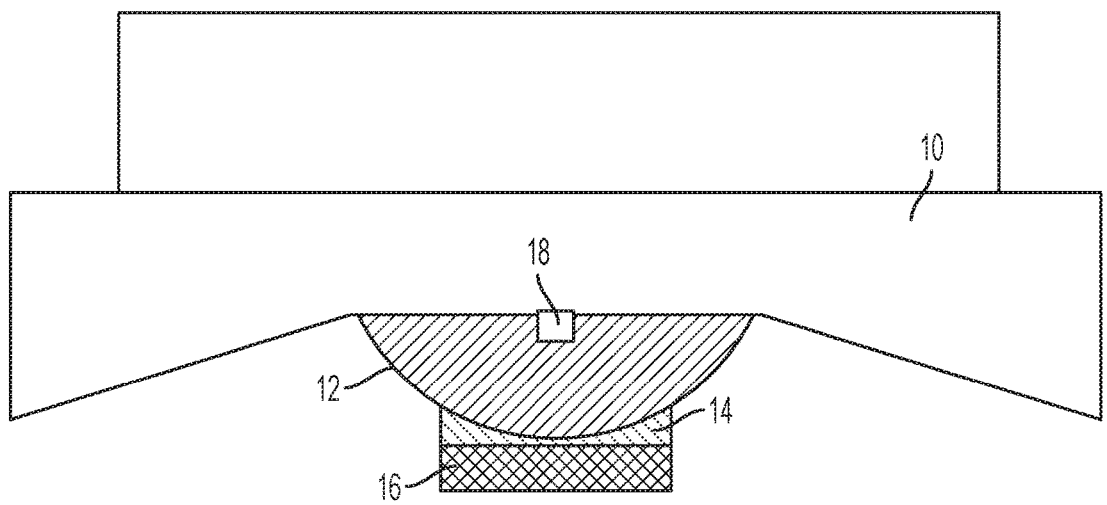
FIG. 1 is a schematic view of a first luminaire with an accessory interface.

FIG. 1 shows a schematic of an exemplary embodiment of a luminaire having a housing 10 and a lens 12 connected to the housing 10. An accessory interface 14 is connected to the lens 12. The accessory interface 14 is configured to receive a control component 16. The accessory interface 14 can surround an opening or aperture that provides communication between the control component 16 and the interior of the housing 10. The lens 12 is positioned over a light emitter 18.

The accessory interface 14 includes a shape-conforming material. The shape-conforming material can include an elastic material and/or a viscoelastic material. The shape-conforming material can be capable of deforming around different size and shape control components to eliminate discontinuities and provide a more uniform exterior appearance. In an exemplary embodiment the shape-conforming material includes silicone.

Figure 2:
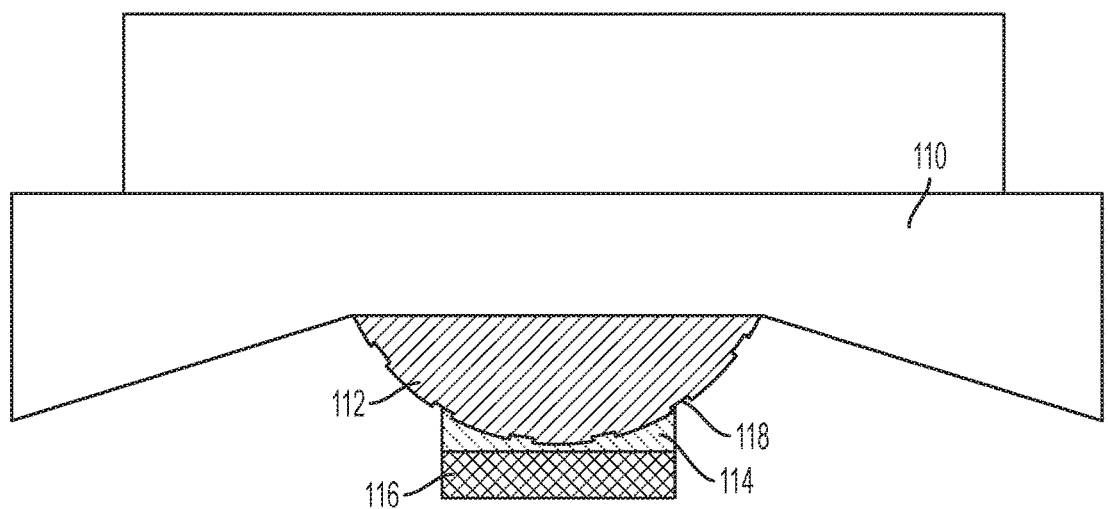
FIG. 2 is a schematic view of a second luminaire with an accessory interface.

FIG. 2 shows another schematic of an exemplary embodiment of a luminaire having a housing no and a lens 112 connected to the housing 110. An accessory interface 114 is connected to the lens 112. The accessory interface 114 is configured to receive a control component 116. The accessory interface 114 includes a shape-conforming material. The lens 112 includes one or more notches 118 formed in an exterior surface.

Figure 3:
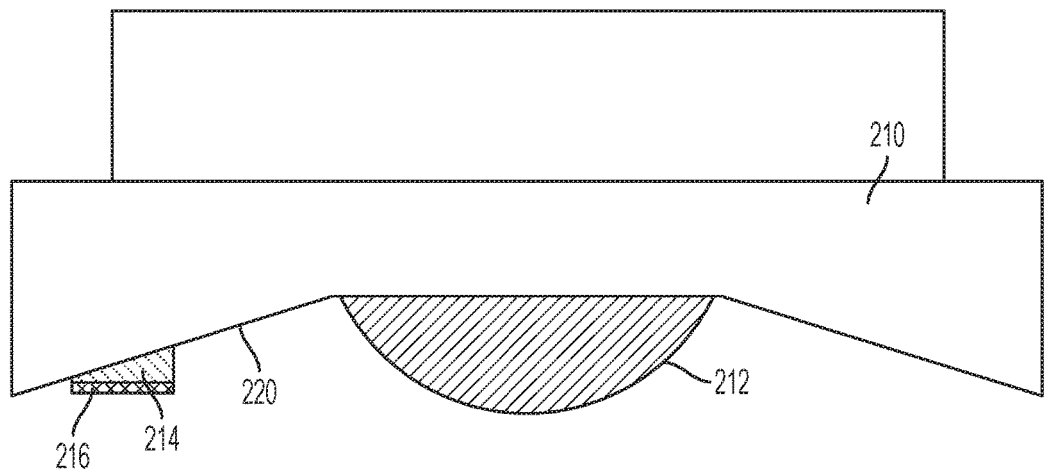
FIG. 3 is a schematic view of a third luminaire with an accessory interface.

FIG. 3 shows another schematic of an exemplary embodiment of a luminaire having a housing 210 and a lens 212 connected to the housing 210. An accessory interface 214 is connected to the lens housing 210. The accessory interface 214 is configured to receive a control component 216. The accessory interface 214 includes a shape-conforming material. The housing 210 includes an angled wall 220, for example an interior surface of a reflector, that extends at a non-horizontal angle relative to an area to be illuminated.

The accessory interface 214 allows the control component 216 to be mounted with a horizontal orientation relative to the area. Maintaining the control component 216 in a horizontal relationship can improve performance, ingress protection rating, and/or aesthetics.

Figure 4:
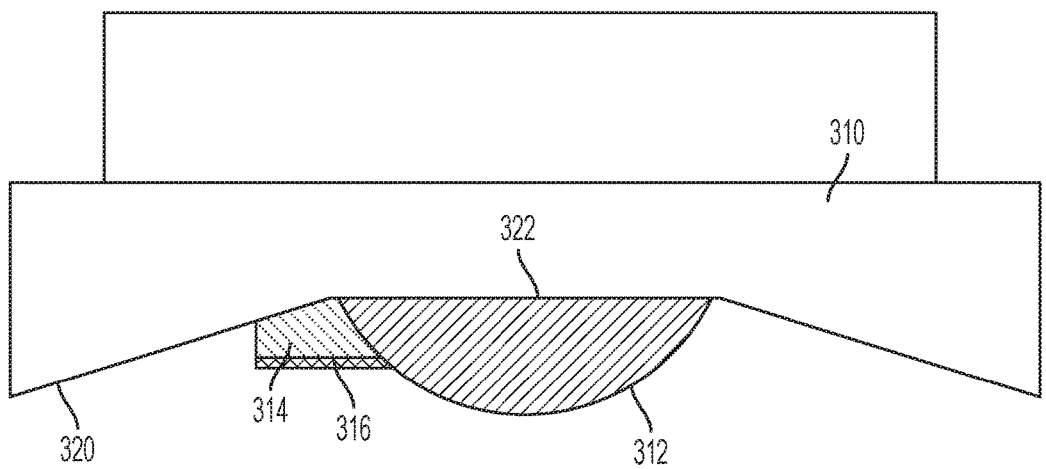
FIG. 4 is a schematic view of a fourth luminaire with an accessory interface.

FIG. 4 shows another schematic of an exemplary embodiment of a luminaire having a housing 310 and a lens 312 connected to the housing 310. An accessory interface 314 is connected to the lens housing 310. The accessory interface 314 is configured to receive a control component 316. The accessory interface 314 includes a shape-conforming material. The housing 310 includes an angled wall 320 and a horizontal wall 322. The accessory interface 314 allows the control component 316 to be mounted with a horizontal orientation across the angled wall 320 and the horizontal wall 322.

Figure 5:
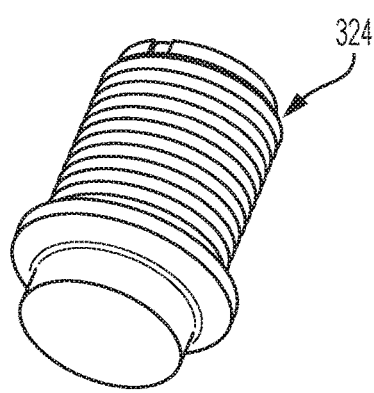
FIGS. 5-9 show various exemplary control components.
Figure 6:
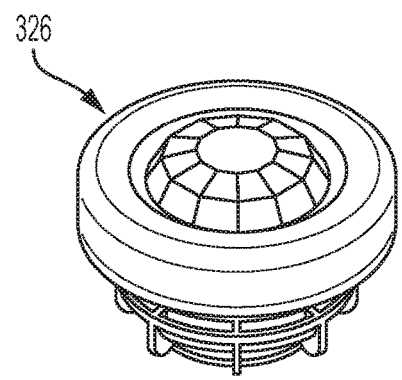
Figure 7:
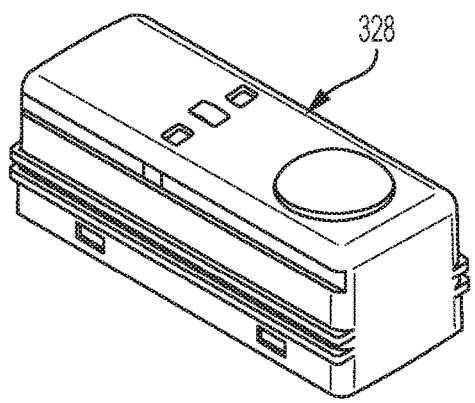
Figure 8:
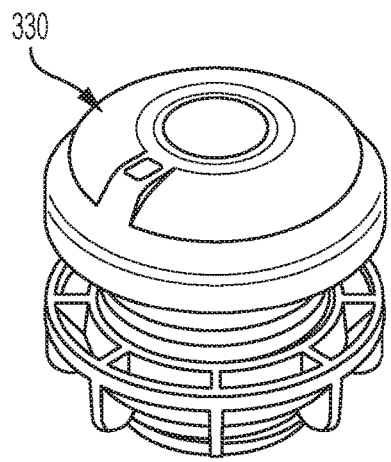
Figure 9:
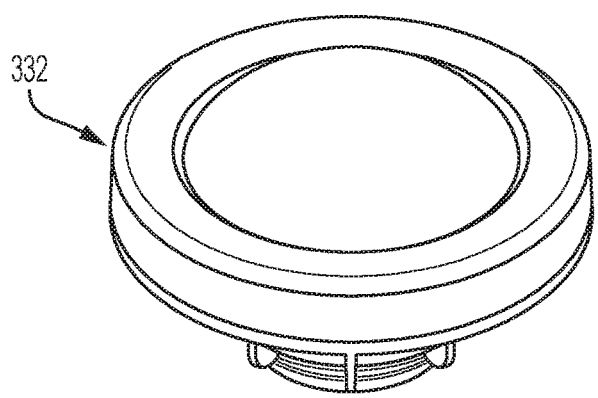

FIGS. 5-9 show examples of different control components that can be connected to a luminaire. FIG. 5 shows a radio module 324 that is used to provide communication between the luminaire and an external component, such as an external sensor or controller. FIG. 6 shows an exemplary embodiment of a first occupancy sensor 326. FIG. 7 shows an exemplary embodiment of a passive infrared sensor 328 configured to detect occupancy, read daylight levels, and provide communications with Bluetooth Low Energy (BLE) devices. FIG. 8 shows another exemplary occupancy sensor 330. FIG. 9 shows another exemplary occupancy sensor 332 configured for use with high mount and outdoor configurations. Additional control components can be associated with the luminaire as would be understood by one of ordinary skill in the art.

Figure 10:
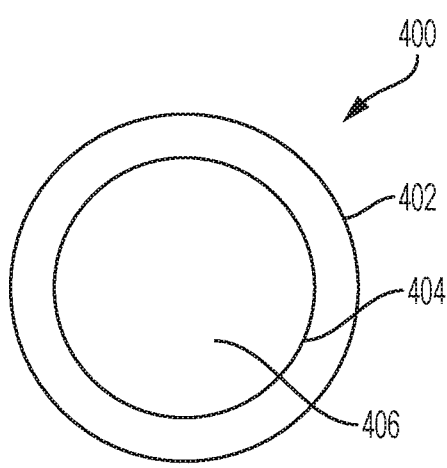
FIG. 10 is a top view of an exemplary accessory interface.
Figure 11:
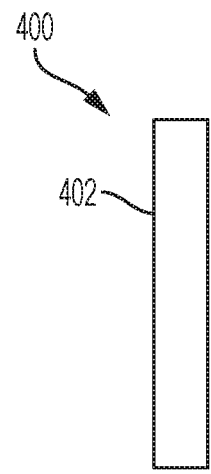
FIG. 11 is a side view of FIG. 10.
Figure 12:
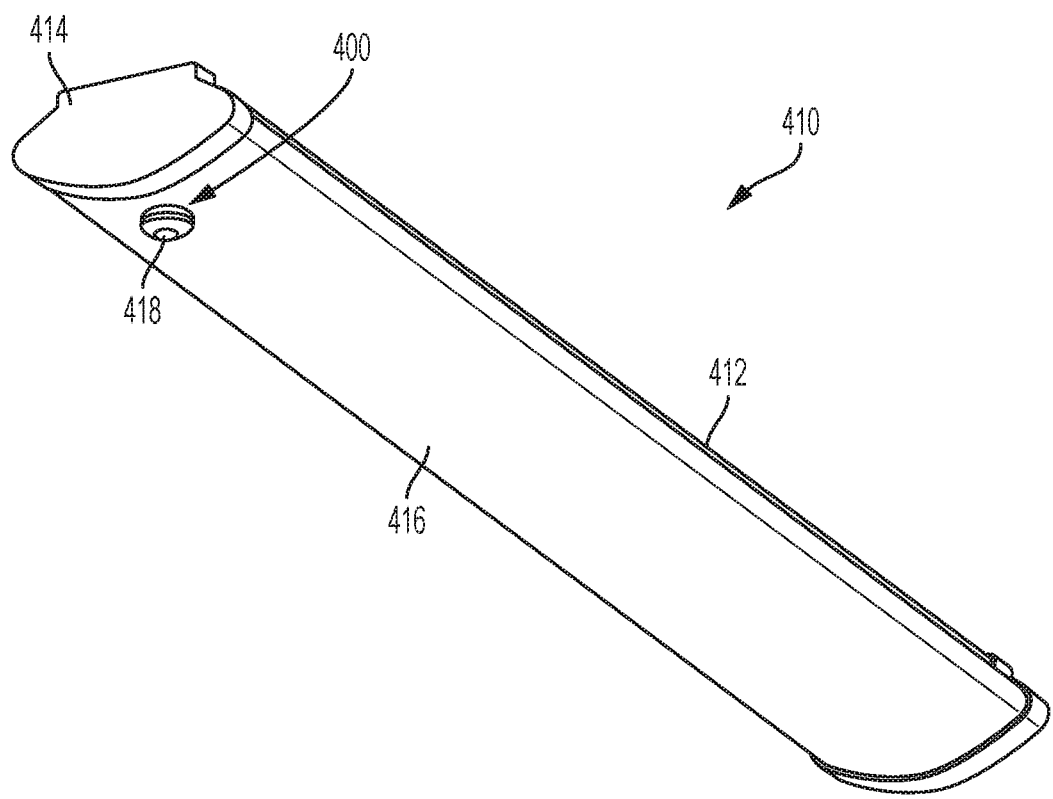
FIG. 12 is a bottom perspective view of an exemplary luminaire with the accessory interface of FIG. 10.
Figure 13:
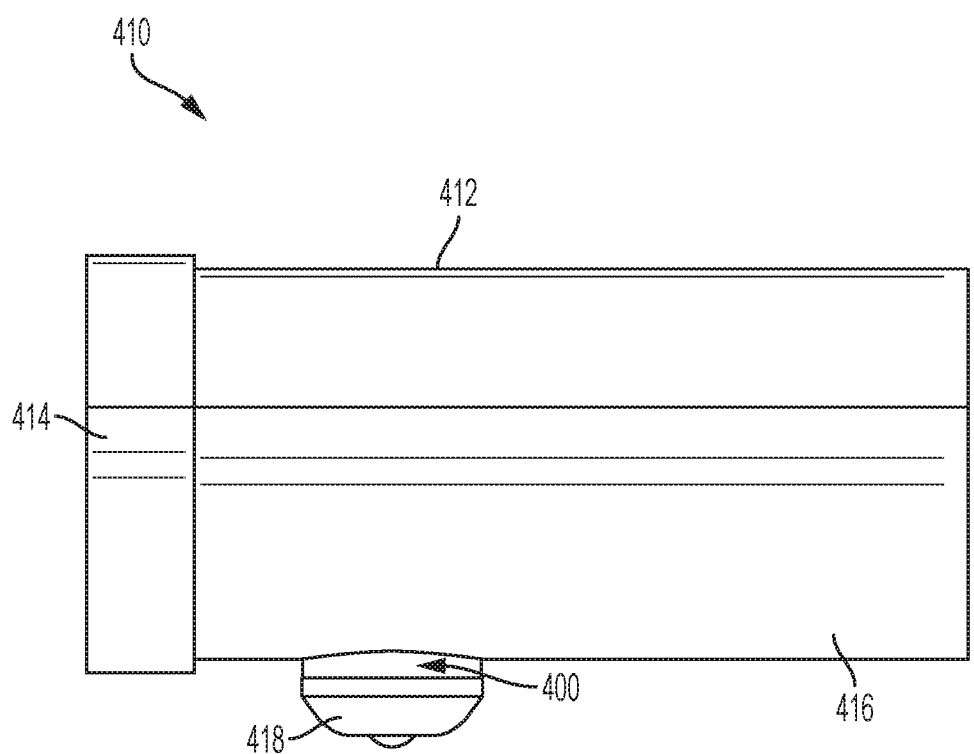
FIG. 13 is an enlarged, partial side view of FIG. 12.

FIGS. 10 and 11 show an exemplary embodiment of an accessory interface 400 having an outer edge 402 and an inner edge 404 defining an open interior 406. The accessory interface 400 is depicted having a ring configuration, however other embodiments can utilize different any size, shape, or configuration. The accessory interface 400 includes a shape-conforming material. For example, the accessory interface includes low-density polyethylene. FIGS. 12 and 13 show the accessory interface 400 used in a luminaire 410. The luminaire 410 includes a housing having a rear support 412 and a pair of end caps 414. A lens 416 is connected to the housing. A sensor 418 is positioned in the housing and extends through the lens 416. The accessory interface 400 is positioned between the lens 416 and an exterior portion of the sensor 418. The lens 416 has a convex curved outer surface and the accessory interface 400 is partially compressed and conforms with the outer surface of the lens 416.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A luminaire comprising:
a housing containing a light emitter;
a lens connected to the housing;
an accessory interface connected to one of the lens or the housing; and
a control component connected to the accessory interface, wherein the accessory interface includes a shape conforming material configured to receive the control component and to eliminate discontinuities between the control component and the lens or housing.

2. The luminaire of claim 1, wherein the shape conforming material includes a viscoelastic material.

3. The luminaire of claim 1, wherein the accessory interface is connected to an angled wall of the housing and is configured to provide a horizontal orientation to the control component.

4. The luminaire of claim 1, wherein the control component includes an occupancy sensor, a light sensor, or a communication module.

5. The luminaire of claim 1, wherein the accessory interface includes low-density polyethylene.

6. The luminaire of claim 1, wherein the control component extends through the lens and the accessory interface is positioned between the lens and an external portion of the control component.

7. The luminaire of claim 1, wherein the accessory interface has a ring configuration.

8. A luminaire comprising:
a housing containing a light emitter;
a lens connected to the housing and having an opening;
a control component extending through the lens opening; and
an accessory interface covering the lens opening, wherein the accessory interface includes a shape conforming material.

9. The luminaire of claim 8, wherein the shape conforming material includes a viscoelastic material.

10. The luminaire of claim 8, wherein the control component includes an occupancy sensor, a light sensor, or a communication module.

11. The luminaire of claim 8, wherein the accessory interface includes low-density polyethylene.

12. The luminaire of claim 8, wherein the accessory interface has a ring configuration.

13. The luminaire of claim 8, wherein the lens includes a curved outer surface and the accessory interface conforms to the curved surface to eliminate visual gaps between the lens and the control component.

14. The luminaire of claim 8, wherein the curved outer surface includes a convex curve.

15. The luminaire of claim 8, wherein the housing includes a rear support and an end cap.

16. A luminaire comprising:
a housing containing a light emitter;
a lens connected to the housing;

a sensor having a first portion positioned inside of the lens and a second portion extending from the exterior of the lens; and an accessory interface positioned between the first portion of the sensor and the second portion of the sensor, wherein the accessory interface includes a shape conforming material.

17. The luminaire of claim 16, wherein the accessory interface is positioned between the lens and the second portion of the sensor.

18. The luminaire of claim 16, wherein the sensory includes an occupancy sensor.

19. The luminaire of claim 16, wherein the accessory interface has an outer edge and an inner edge defining an opening for receiving the sensor.

20. The luminaire of claim 16, wherein the lens includes a curved outer surface and the accessory interface conforms to the curved surface to eliminate visual gaps between the lens and the control component.

* * * * *